July 27, 1965 A. M. PALOMBO 3,197,082
APPARATUS FOR IMPREGNATING FOAM MATERIALS
Original Filed June 24, 1959
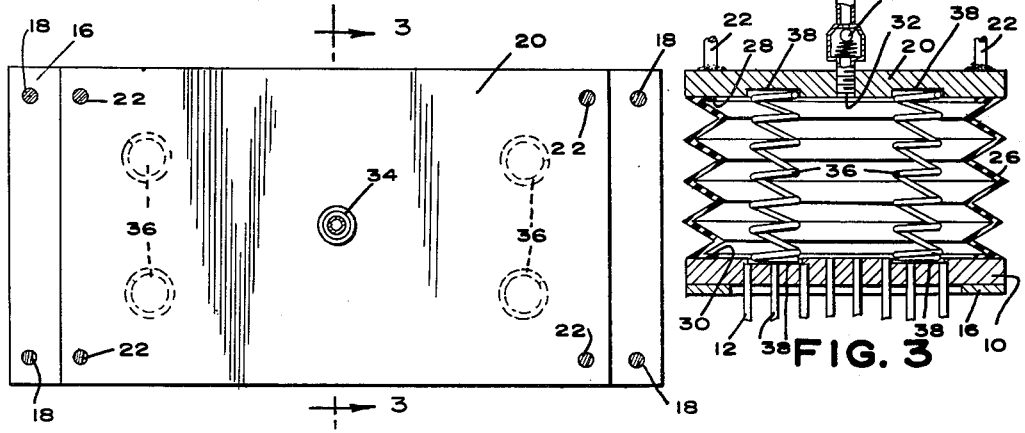
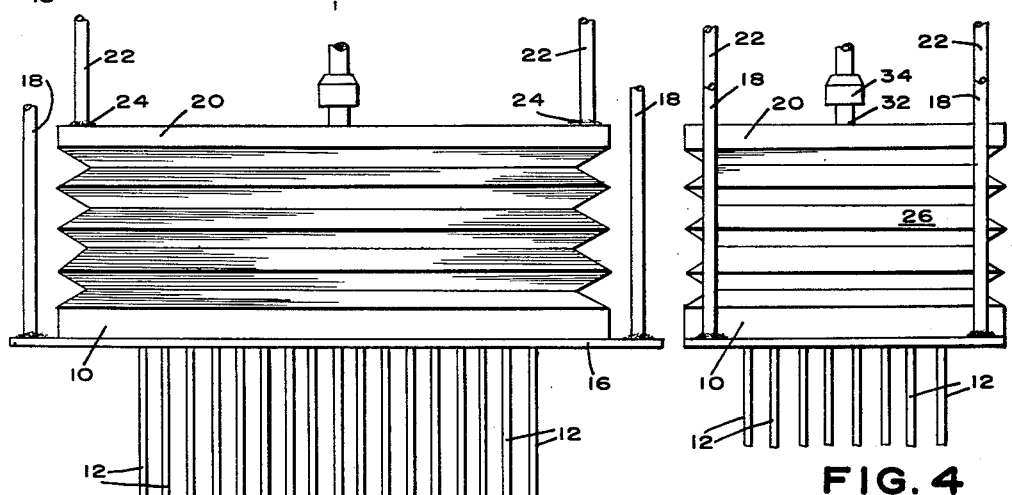
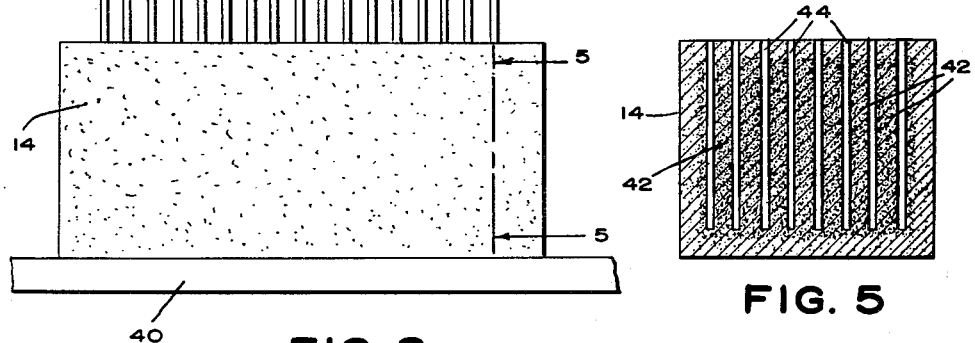
INVENTOR
ALBERT M. PALOMBO
BY
ATTORNEYS

United States Patent Office 3,197,082
Patented July 27, 1965

3,197,082
APPARATUS FOR IMPREGNATING FOAM MATERIALS
Albert M. Palombo, Arlington, Mass., assignor to American Metaseal of Massachusetts, Inc., a corporation of Massachusetts
Original application June 24, 1959, Ser. No. 822,594, now Patent No. 3,049,444, dated Aug. 14, 1962. Divided and this application Apr. 6, 1962, Ser. No. 185,854
7 Claims. (Cl. 222—207)

This application is a division of my copending application, Serial No. 822,594, filed June 24, 1959, now U.S. Patent No. 3,049,444, patented August 14, 1962.

This invention relates to improvements in impregnated articles especially well adapted for floral displays and apparatus for the production of such articles.

In the patent to Smithers, No. 2,753,277, dated July 3, 1956, there was disclosed the application of a layer of wetting agent on the exterior of a mass of a foamed synthetic material selected from the group consisting of urea-formaldehyde and a phenolic condensation resin. It has been found that where such masses are coated externally by such wetting agents, the time during which the masses must be held submerged in water in order to saturate them is excessive and, accordingly, expensive.

After extended research, the present invention has evolved rendering it possible to provide a product which requires a much shorter period of submergence to achieve the required degree of saturation to serve the purpose for which the articles are intended.

The impregnating apparatus contemplated by the present invention comprises a body member carrying a plurality of tubular nozzles movable towards and from a work piece, a pressure applying member defining an expansible chamber with the body member, the pressure applying member being movable towards the body member to eject fluid through the nozzles, force transmitting means for moving the body member towards and from the work piece, and force applying means for moving the pressure applying member towards the body member. The expansible chamber thus formed contains an inlet port provided with a check valve opening inwardly relative to the chamber. The pressure applying member and the body member are preferably spaced parallel plates connected by a wall of flexible material such as rubber or a rubber-like material. The pressure applying member and body member are preferably provided with biasing means tending to expand the chamber.

The impregnated article assumes the form of a water retentive mass of foamed cellular synthetic material selected from the group consisting of urea-formaldehyde and a phenolic condensation resin, the mass having exterior surfaces at least one of which is penetrated by a plurality of parallel passages, and a wetting agent disposed entirely within the mass in spaced relationship to the exterior surfaces. The mass preferably has opposed exterior surfaces penetrated by the passages. The wetting agent is disposed along such passages in spaced relationship to the exterior surfaces.

A more complete understanding of the invention will follow a description based upon the accompanying drawings wherein:

FIG. 1 is a plan view of apparatus contemplated by the present invention;

FIG. 2 is a side elevation depicting the apparatus with respect to a work piece;

FIG. 3 is a fragmentary sectional elevation taken along line 3—3 of FIG. 1;

FIG. 4 is an end elevation of the apparatus; and

FIG. 5 is a section of the impregnated article taken along line 5—5 of FIG. 2.

Various types of foam materials have been used in floral displays for holding flower stems in bores or recesses. The foam materials for such use are generally rigid and used as a mass large enough to receive the stems of the desired number of flowers or the like to be displayed. However, the foam masses or blocks absorb water very poorly despite the presence of a large percentage of open cells. For example, a foamed block prepared from a resin mix of phenolformaldehyde resin (other phenolic condensation resins or urea-formaldehyde resins, for example, may also be used) and including small amounts of a softening agent and a hardening agent in addition to the foaming agent, as described in the Smithers Patent No. 2,753,277, absorbs water very poorly despite the fact it usually contains 45% open cells.

As is well known in the art, a block of such foam weighing 0.06 lb. immersed in water for 30 minutes absorbs only 0.19 lb. of water; immersed for 60 minutes it absorbs only 0.21 lb. of water; and immersed for 6 hours absorbs only 0.24 lb. of water.

Whereas the application of an exterior coating of a wetting agent to such a block improves the absorptive properties of the foam as set forth in the Smithers Patent No. 2,753,277, the degree and rate of absorption of water have been greatly increased in accordance with the present invention by distributing a wetting agent throughout the interior of the mass or block but in spaced relationship to the exterior surfaces thereof so as to avoid loss of any of the wetting agent through handling.

Many types of wetting agents may be employed for purposes of the present invention including polyglycol ether, artificial soaps, "Igepal" manufactured by Antara Products Company, which is reputedly alkyl phenoxy polyoxyethylene ethanol, and "Renex No. 35," manufactured by Atlas Powder Company. The amount of wetting agent employed will be small enough to avoid adverse effects on the flowers to be supported. The impregnated product of the present invention absorbs water from six to ten times as rapidly as where the wetting agent is applied as an external film.

The apparatus depicted in the drawings includes a lower plate or body member 10 through which a plurality of tubular nozzles 12 extend and from which they depend downwardly a distance sufficient to penetrate almost through the work piece 14. Secured to the periphery of the body member 10 there is a frame 16 to which is secured by welding or otherwise a plurality of rods 18 to serve as force transmitting elements. Above the body member or lower plate 10 there is provided a pressure applying member or upper plate 20 to whose upper surface force transmitting members assuming the form of rods 22 are secured by welding 24 or in other suitable fashion. A sheet of flexible material 26 such as rubber or a rubber-like material has an upper edge 28 secured to the lower surface of the upper plate 20 and a lower edge 30 secured to the upper surface of the lower plate 10 by means of a suitable adhesive. Thus the flexible material 26 forms with the lower plate 10 and the upper plate 20 an expansible chamber into which fluid can be introduced through an inlet port 32 from a suitable source through a check valve 34 opening inwardly with respect to the expansible chamber. The chamber is biased towards its expanded condition by means of compression springs 36 whose ends are received in recesses 38 formed in the inner surfaces of the lower plate 10 and upper plate 20. Various other arrangements can be employed for injecting the fluid under pressure from a valve controlled chamber, through the nozzles, into the interior of the foamed cellular material.

As depicted in FIG. 2, the mass of foamed cellular synthetic material 14 is supported on a table 40, the upper surface of the mass lying in contact with the ends of the tubular nozzles 12. Now assuming that the expansible chamber defined between the lower plate 10 and the upper plate 20 with the flexible material 26 is full of the wetting agent, the lower plate 10 will first be lowered by means of the force transmitting rods 18 until the ends of the tubular nozzles are well below the upper surface of the mass 14. Then, further downward movement of the lower plate 10 will be accompanied by a downward movement of the upper plate 20 with respect to the lower plate 10 by means of the force transmitting rods 22 so that wetting agent will be ejected from the ends of the nozzles for distribution internally of the mass 14 and this compound motion will be continued until the lower ends of the tubular nozzles 12 reach a level substantially above the lower surface of the mass 14, whereupon downward motion will be discontinued. The upper plate 20 may then be elevated ahead of the lower plate 10 with the result that any excess wetting agent will be drawn up through the tubular nozzles 12 into the expansible chamber and additional wetting agent will be sucked from the source through the check valve 34 in preparation for a new operation. Upward movement of the plates 10 and 20 will be effected in a manner to prevent any further ejection of wetting agent until a new mass to be impregnated has been positioned on the support 40 in substitution for the mass which has been impregnated already.

A cross section through the foamed cellular synthetic mass after it has been impregnated appears in FIG. 5 wherein the denser stippling denotes the presence of the wetting agent 42 and the lighter peripheral stippling indicates the portion which is completely free from the wetting agent. It will be noted that the mass contains a plurality of parallel passages 44 corresponding in number and spacing to the tubular nozzles 12. The presence of these passages 44 permits the rapid entry of water when the mass is submerged therein so that the mass will become completely saturated in far less time than has been the case with any product proposed heretofore.

The impregnated material can be used to support flowers by the insertion of their stems into the saturated mass in the manner already known in the art.

Variations of the apparatus and product as will be suggested by the foregoing disclosure to those skilled in the art are contemplated by the appended claims.

I claim:

1. Impregnating apparatus comprising a body member carrying a plurality of tubular nozzles, said body member being movable towards and from a work piece in response to a moving force, a pressure applying member defining an expansible chamber with said body member communicating with each of said plurality of nozzles, said pressure applying member being movable towards said body member in response to the same moving force to eject fluid through said nozzles.

2. Impregnating apparatus as set forth in claim 1 wherein said expansible chamber contains an inlet port provided with a check valve opening inwardly relative to said chamber.

3. Impregnating apparatus as set forth in claim 1 wherein said pressure applying member and body member are spaced parallel plates connected by a wall of flexible material.

4. Impregnating apparatus as set forth in claim 1 wherein said members are provided with biasing means therebetween tending to expand said chamber.

5. Impregnating apparatus comprising a body member carrying a plurality of tubular nozzles movable toward and from a work piece in response to a moving force, a pressure applying member defining a common expansible chamber with said body member and in continuous communication with each of said nozzles, and means defining an inlet to said chamber, said pressure applying member being movable toward said body member in response to the same moving force to eject fluid from said common chamber through each of said nozzles.

6. Impregnating apparatus comprising a body member carrying a plurality of tubular nozzles for movement into cavities in a work piece, said body member being movable toward and from the work piece in response to a moving force for carrying said nozzles into and out of said work piece, a pressure applying member defining a common expansible chamber with said body member and in continuous communication with each of said nozzles, and means defining an inlet to said chamber, said pressure applying member being movable toward said body member in response to the same moving force to eject fluid from said common chamber through each of said nozzles and being thereupon movable away from said body member to draw fluid through said nozzles and through said inlet into said chamber.

7. Impregnating apparatus comprising a body member movable towards and away from a work piece in response to a moving force, said body member carrying a plurality of tubular nozzles for insertion into said work piece and adapted to emit a fluid therein, said body member comprising a plate retaining said nozzles therein; a pressure applying member comprising a second plate spaced parallel to said body member and movable towards and away from said body member in response to the same moving force, a wall of flexible material connected thereto and to said body member forming an expansible fluid chamber, said chamber being in communication with said nozzles; spring means positioned between the body member and the pressure applying member, said spring means tending to expand said chamber; and a fluid inlet port in said chamber provided with a check valve opening inwardly into said chamber whereby fluid may be introduced into said chamber; said apparatus being movable in operation toward a work piece to inject a fluid thereinto and movable away from said work piece on completion of said injection whereupon said expansible chamber operates to draw some fluid back through said nozzles to create a positive shutoff.

References Cited by the Examiner

UNITED STATES PATENTS

| | | | |
|---|---|---|---|
| 1,062,257 | 5/13 | Scheuer | 118—254 |
| 2,699,717 | 1/55 | Moreland et al. | 99—257 |
| 2,784,882 | 3/57 | Du Bois | 222—215 |
| 3,062,682 | 11/62 | Morgan et al. | 118—411 |

RICHARD D. NEVIUS, *Primary Examiner.*

JOSEPH B. SPENCER, *Examiner.*